US012244105B2

(12) United States Patent
Ruffini et al.

(10) Patent No.: US 12,244,105 B2
(45) Date of Patent: Mar. 4, 2025

(54) ISOLATION COMPONENT FOR A TIGHTLY PACKAGED HIGH SPEED CONNECTOR

(71) Applicant: TE Connectivity Solutions GmbH, Schaffhausen (CH)

(72) Inventors: Nicholas Paul Ruffini, Lancaster, PA (US); Dustin Carson Belack, Hummelstown, PA (US)

(73) Assignee: TE Connectivity Solutions GmbH (CH)

( * ) Notice: Subject to any disclaimer, the term of this patent is extended or adjusted under 35 U.S.C. 154(b) by 383 days.

(21) Appl. No.: 17/732,596

(22) Filed: Apr. 29, 2022

(65) Prior Publication Data

US 2023/0352883 A1 Nov. 2, 2023

(51) Int. Cl.
*H01R 13/6592* (2011.01)
*H01R 13/6463* (2011.01)

(52) U.S. Cl.
CPC ..... *H01R 13/6592* (2013.01); *H01R 13/6463* (2013.01)

(58) Field of Classification Search
CPC .................................................. H01R 13/6463
USPC ........................................ 439/607.47, 607.48
See application file for complete search history.

(56) References Cited

U.S. PATENT DOCUMENTS 9,257,796 B1 2/2016 Dang
2012/0034809 A1 2/2012 Reimchen
2015/0270647 A1 9/2015 Hoher et al.
2017/0365937 A1 12/2017 Julliet et al.
2020/0412064 A1 12/2020 Nguyen
2022/0094108 A1 3/2022 Watanabe et al.
2022/0311171 A1 * 9/2022 Matsuoka ............ H01R 13/405
2023/0352868 A1 11/2023 Ruffini et al.
2023/0352882 A1 11/2023 Ruffini et al.
2023/0352884 A1 11/2023 Ruffini et al.

FOREIGN PATENT DOCUMENTS

DE 202015103479 U1 8/2015
DE 202015100245 U1 2/2016
DE 102019106980 B3 7/2020

OTHER PUBLICATIONS

European Search Report 23170513 Mailed Date Sep. 5, 2023 European App. No. 23170513.8-1201.

* cited by examiner

*Primary Examiner* — Phuong K Dinh

(57) ABSTRACT

An assembly for terminating a high speed cable. The assembly includes a shell housing having a mating end and a conductor receiving end. A mating portion extends from the mating end. The mating portion has a contact receiving opening with an inside wall which extends circumferentially around the opening. A crosstalk shield is provided in the shell housing. Contacts are positioned in the contact receiving opening of the housing. The contacts terminate high speed conductors of the high speed cable. A nonconductive component is provided on the inside wall in the mating portion of the shell housing. The nonconductive component electrically and physically isolates the contacts from the shell housing.

16 Claims, 4 Drawing Sheets

ISOLATION COMPONENT FOR A TIGHTLY PACKAGED HIGH SPEED CONNECTOR

FIELD OF THE INVENTION

The present invention relates to a high speed, tightly packaged electrical connector. In particular, the invention is directed to a preassembled nonconductive spacer which optimizes the positioning of the high speed signal contacts in the connector shell.

BACKGROUND OF THE INVENTION

As high speed connectors become more compact, the spacing in the connector shell must be properly configured to optimize performance. However, existing high speed contacts are not able to maintain a contact pitch for optimal signal integrity (SI) performance, causing the connector shell to be larger than needed or the signal integrity to be diminished. To achieve better spacing and voltage integrity, various connectors require the insertion of a nonconductive spacer to be inserted into the shell after the contacts have been terminated and positioned in the shell of the connector.

Although adding an appropriate spacer after the contacts have been positioned in the shell of the connector may provide desired signal integrity, the field application of such spacers is difficult and time consuming for the user. Including additional components and sacrificing more signal contacts to maintain spacing will impact connector assembly and performance.

It is therefore desirable to provide an isolation component for a tightly packaged high speed connector which enhances the signal integrity (SI) performance of the signal contacts. It would be advantageous to provide an isolation component which can be preassembled to the shell of the connector prior to shipping the connector shell to the customer.

SUMMARY OF THE INVENTION

An object of the present invention is to Install a thin, nonconductive layer or component inside a conductive shell of a high speed connector in a mating area where the contacts are oriented very close to the conductive shell (mating area). The thin, nonconductive layer or component allows optimal spacing to be maintained while preventing high voltage failures.

An object of the present invention is to preassembly the nonconductive component in the conductive subassembly so customers will not have to assemble it themselves, saving time and maintaining performance.

The thin, nonconductive layer may be in many forms. In one illustrative example, a thin layer of Kapton tape may be applied and fixed to the inner diameter of the affected area. In another illustrative embodiment, a molded component could be installed and trapped inside the shell. In yet another illustrative embodiment, the affected inner diameter of the shell has a nonconductive surface treatment applied to achieve the isolating affect.

An embodiment is directed to an assembly for terminating a high speed cable. The assembly includes a shell housing having a mating end and a conductor receiving end. A mating portion extends from the mating end. The mating portion has a contact receiving opening with an inside wall which extends circumferentially around the opening. A crosstalk shield is provided in the shell housing. Contacts are positioned in the contact receiving opening of the housing. The contacts terminate high speed conductors of the high speed cable. A nonconductive component is provided on the inside wall in the mating portion of the shell housing. The nonconductive component electrically and physically isolates the contacts from the shell housing.

An embodiment is directed to an assembly for terminating a high speed cable. The assembly includes a shell housing with a mating end and a conductor receiving end, with a mating portion extending from the mating end. The mating portion has a contact receiving opening with an inside wall which extends circumferentially around the opening. A crosstalk shield is provided in the shell housing. The crosstalk shield has a first shield member and a second shield member which define contact receiving cavities. The first shield member and the second shield member have mounting sections and mating sections, the mating sections are positioned in the mating portion of the shell housing. Contacts are positioned in contact spacers in contact receiving cavities in the contact receiving opening of the housing. The contacts terminate high speed conductors of the high speed cable. The contact receiving cavities are defined by the first shield member and the second shield member of the crosstalk shield. A nonconductive component is provided on the inside wall in the mating portion of the shell housing. The nonconductive component electrically and physically isolates the contacts from the shell housing.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
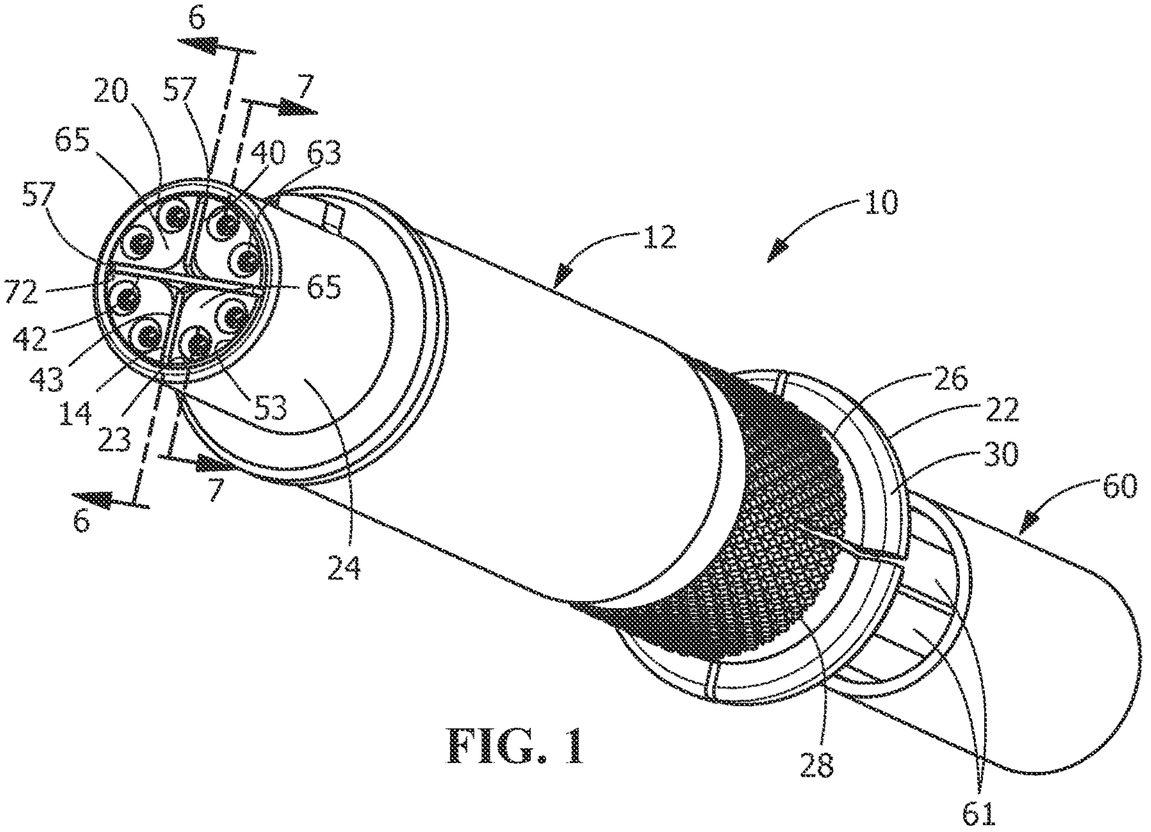
FIG. 1 is a front, side perspective view of an illustrative high speed connector assembly with an illustrative thin, nonconductive layer or component positioned in a mating area of the connector assembly.
Figure 2:
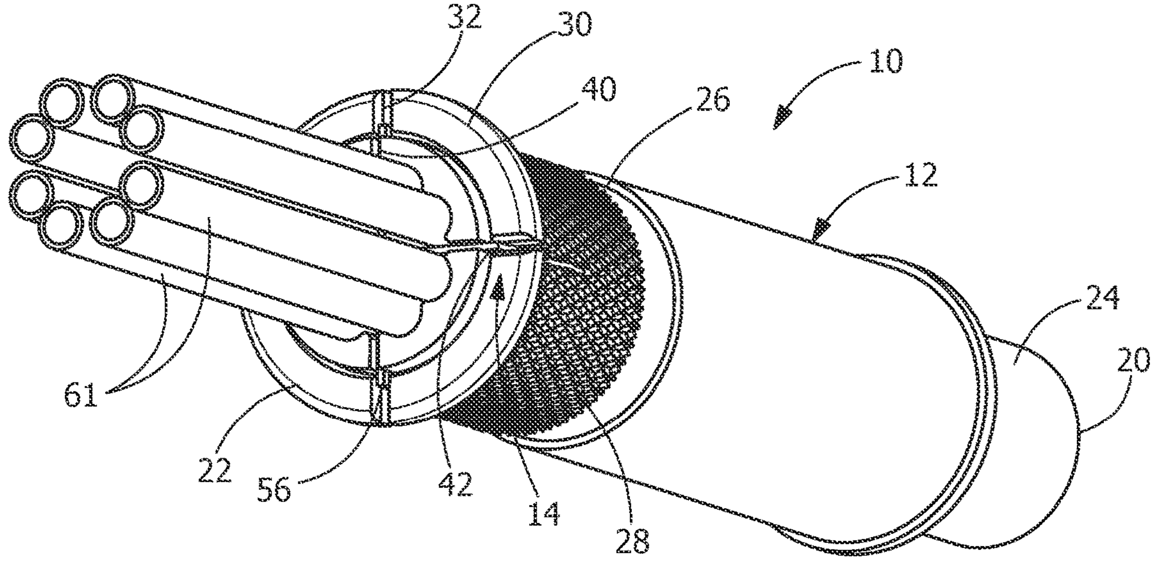
FIG. 2 is a back, side perspective view of the illustrative high speed connector assembly of FIG. 1.
Figure 3:
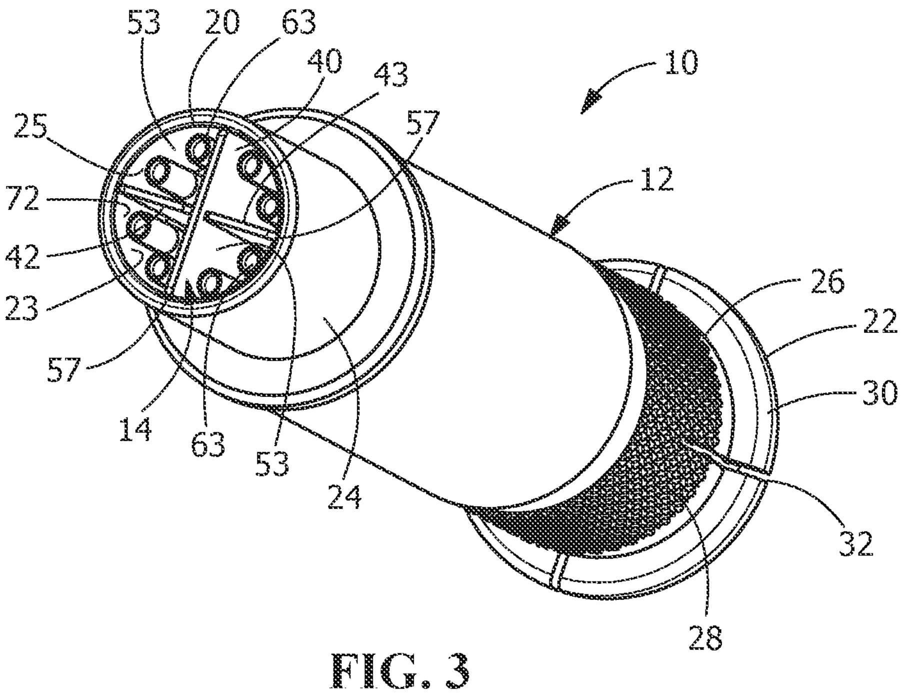
FIG. 3 is a perspective view of the illustrative high speed connector assembly of FIG. 1 with the contact spacers not shown.
Figure 4:
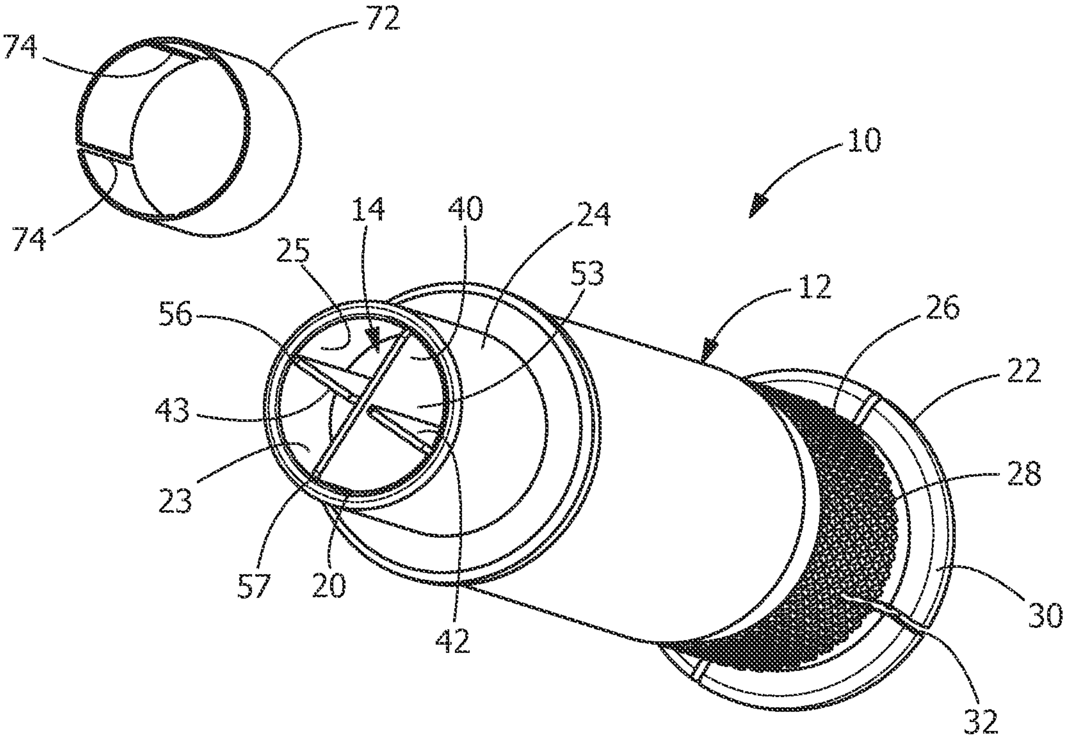
FIG. 4 is a perspective view of the illustrative high speed connector assembly of FIG. 1 with the contacts and contact spacers removed and the thin, nonconductive layer or component exploded from the mating end of the connector assembly.
Figure 5:
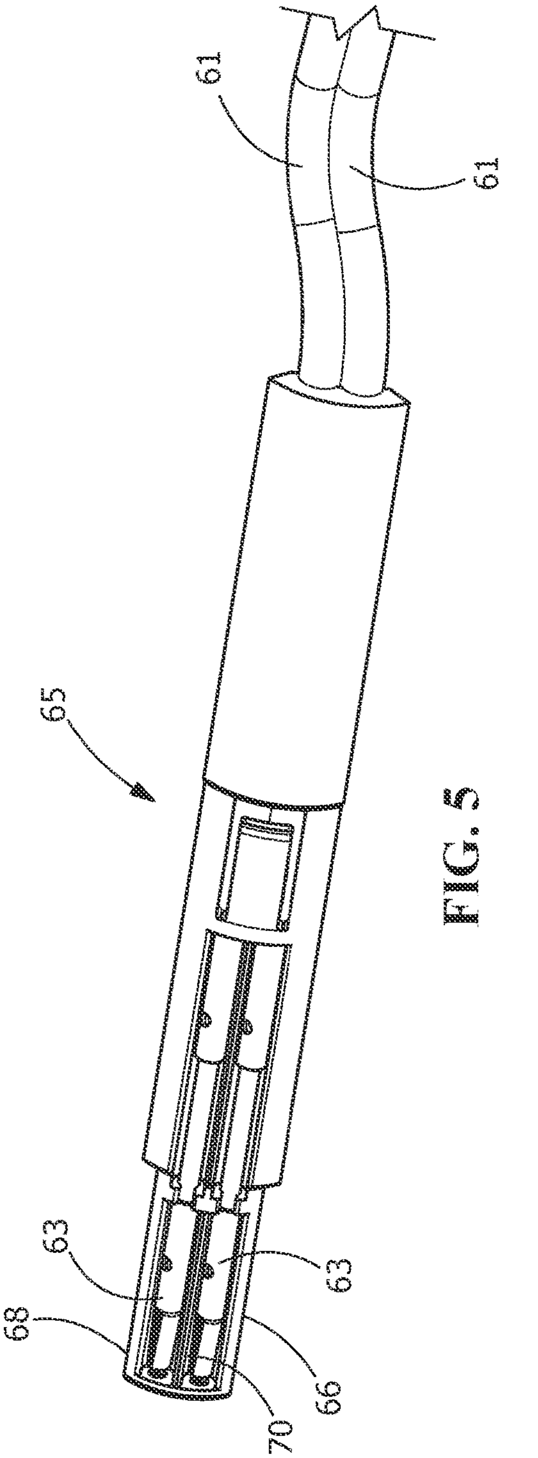
FIG. 5 is a perspective view of a contact spacer with two contacts positioned therein.
Figure 6:
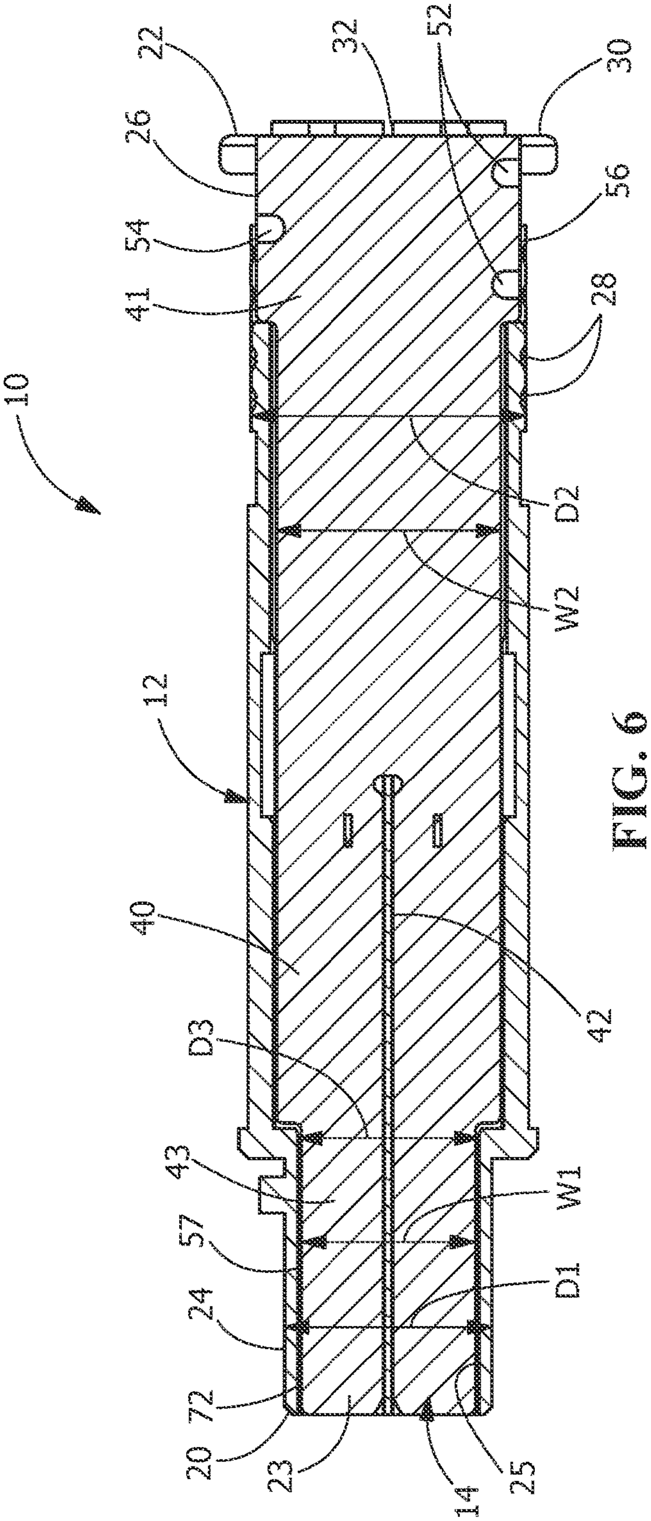
FIG. 6 is cross-sectional view taken along line 6-6 of FIG. 1.
Figure 7:
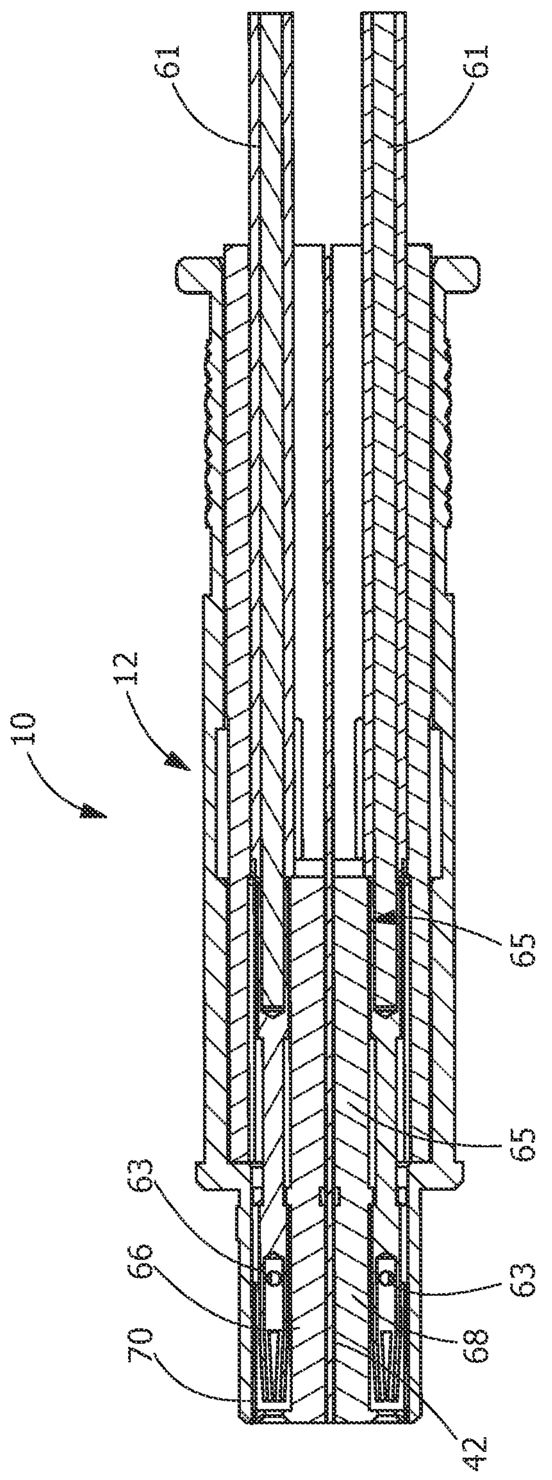
FIG. 7 is cross-sectional view taken along line 7-7 of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top” and “bottom”

as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIG. 1, an electrical connector assembly 10 has a shell housing 12 and a crosstalk shield 14. The connector assembly 10 may be a plug connector assembly or a receptacle connector assembly. The connector assembly The shell housing 12 has a mating end 20 and a conductor receiving end 22. In the illustrative embodiment shown, the shell housing 12 has a mating portion 24 proximate the mating end 20. The mating portion 24 has a smaller outside diameter D1 than the remainder of the shell housing 12. The mating portion 24 has a contact receiving opening 23 with an inner or inside wall 25 which extends circumferentially around the opening 23. However, other configurations of the shell housing 12 may be used.

A recessed portion 26 is provided on the shell housing 12 proximate the conductor receiving end 22. The recessed portion 26 has multiple projections 28 which extend from the surface thereof. The recessed portion 26 has an outer diameter of D2, which is larger than the outside diameter D1 of the mating portion 24. A shoulder 30 extends circumferentially around the conductor receiving end 22 of the shell housing 12. The shoulder 30 is provided at one end of the recess portion 26. However, other configurations of the shell housing 12 may be used.

Crosstalk shield receiving recesses or slots 32 extend from the conductor receiving end 22 toward the mating end 20. The crosstalk shield receiving slots 32 extend through the shoulder 30 and into the recessed portion 26. In the embodiment shown, four crosstalk shield receiving slots 32 are provided to accommodate the configuration of the crosstalk shield 14. However, other numbers of crosstalk shield receiving slots 32 may be used to accommodate different configurations of the crosstalk shield 14.

The crosstalk shield 14 has a first shield member 40 and a second shield member 42. In the illustrative embodiment, the first shield member 40 and the second shield member 42 are made from nickel silver material, however, other materials, including corrosion resistant materials, may be used which exhibit the shielding characteristics required.

The first shield member 40 and the second shield member 42 have mounting sections 41 and mating sections 43. The width W1 of the mating sections 43 are smaller than the width W2 of the mounting sections 41. The mating sections 43 are positioned in the mating portion 24 of the shell housing 12.

The first shield member 40 and the second shield member 42 have one or more first projections or embossments 52 and one or more second projections or embossments 54 which extend from side edges 56 of the mounting sections 41. The first embossments 52 extend from side edges 56 of the first shield member 40 and the second shield member 42 in a direction which is essentially perpendicular to the longitudinal axis of the first shield member 40 and the second shield member 42. The second embossments 54 extend from side edges 56 of the first portion 44 in a direction which is essentially perpendicular to the longitudinal axis of the first shield member 40 and the second shield member 42, and in a direction opposite from the first embossments 52.

The mating sections 43 of the first shield member 40 and the second shield member 42 have side edges 57. The width W1 of the mating sections 43 is less than the inside diameter D3 of the contact receiving opening 23 of the mating portion 24 of the connector shell housing 12. Consequently, the side edges 57 of the mating sections 43 of the first shield member 40 and the second shield member 42 are spaced from the inside wall 25 of the mating portion 24. The difference between the distance D3 and distance W1 will be sized to suit the voltage the dielectric properties of the components. In one illustrative embodiment, the difference between the distance D3 and distance W1 is between approximately 0.1 mm to approximately 0.5 mm, and preferably between approximately 0.15 mm to approximately 0.3 mm.

The connector assembly 10, including the shell housing 12 and the crosstalk shield 14 are illustrative. Other types and configurations of the connector assembly 10 may be used.

A high speed cable 60 with differential pairs of signal conductors 61 is terminated to the shield housing 12 of the connector assembly 10. The signal conductors 61 have contacts 63 terminated thereto. In the illustrative embodiment shown, four pairs, or eight contacts 63 are shown. Each of the differential pairs of contacts 63 are positioned in contact insulators or spacers 65 and the contact insulators 65 are positioned in the contact receiving cavities 53 defined by the first shield member 40 and the second shield member 42 of the crosstalk shield 14.

Each contact spacer 65 houses two contacts 63. The contact spacers 65 have a triangular configuration with a first closed side 66, a second closed side 68 and a third open side 70. When assembled, the first closed side 66 and the second closed side 68 are positioned proximate the first shield member 40 and the second shield member 42. The open third side 70 is positioned proximate the inside wall 25 of the mating portion 24. The open third side 70 is necessitated to allow the contacts 63 to be properly inserted into the contact spacers 65.

A thin, nonconductive, insulative layer or component 72 is provided in the contact receiving opening 23 of the mating portion 24 of the shell housing 12. The thin, nonconductive component 72 may be in many forms. In one illustrative example, a thin layer of Kapton tape may be applied and fixed to the inside wall 25. In another illustrative embodiment, a molded component could be installed and trapped inside the mating portion 24 of the shell housing 12. In yet another illustrative embodiment, the inside wall 25 of the mating portion 24 may have a nonconductive surface treatment applied thereto to achieve the isolating affect.

The thin, nonconductive, insulative component 72 may be maintained in the contact receiving opening 23 of the mating portion 24 by adhesive, frictional engagement, bonding or other known methods. The thin, nonconductive component 72 has a generally uniform thickness of between approximately 0.1 mm to approximately 0.5 mm, and preferably between approximately 0.15 mm to approximately 0.25 mm.

The thickness of the thin, nonconductive component 72 is sufficient to isolate the contacts 63 from the metallic shell housing 12.

In the illustrative embodiment shown, the thin, nonconductive component 72 has recesses 74 spaced periodically about the inner circumferences of the component 72. The recesses 74 are positioned to be aligned with the side edges 57 of the mating sections 43 of the first shield member 40 and the second shield member 42. In this illustrative embodiment, the recesses 74 are of reduced cross section as compared to the remainder of the thin, nonconductive component 72. The reduced cross section provides clearance for the side edges 57 of the mating sections 43, allowing the reminder of the thin, nonconductive component 72 to have sufficient thickness to isolate the contacts 63 from the metallic shell housing 12. In other embodiments, the spacing of the side edges 57 from the inside wall 25 is sufficient to allow the positioning of the thin, nonconductive component 72 without the need for recesses 74.

As the size of electrical connector assemblies in general must be reduced to accommodate the small envelopes of the system in which they are installed, it is important to arrange all the components of the electrical connector assembly 10 in a manner to optimize performance and minimize the overall dimensions of the electrical connector assembly 10. In particular, the contacts 63 must be situated in such a way that leaves very short creepage and clearance distances with relation to the conductive shell housing 12. Without proper isolation, the proximity of the contacts 63 to the conductive shell housing 12 could cause a short circuit failure during irregular high voltage scenarios. The thin, nonconductive component 72 of the present invention allows the contacts 63 to be inserted and remain in close proximity to the inside wall 25 of the conductive shell housing 12 while preventing or minimizing the change of a short circuit failure.

In the illustrative embodiment shown, the thin, nonconductive component 72 is positively retained in the contact receiving opening 23 of the mating portion 24 by adhesive, frictional engagement, bonding or other known methods. Consequently, the thin, nonconductive component 72 is assembled to the shell housing 12 during manufacturing of the connector assembly 10, rather than in the field where the assembly is currently done.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An assembly for terminating a high speed cable, the assembly comprising:

a shell housing having a mating end and a conductor receiving end, a mating portion extending from the mating end, the mating portion having a contact receiving opening with an inside wall which extends circumferentially around the opening, the mating portion having a smaller outside diameter than an outside diameter of the remainder of the shell housing;

a crosstalk shield provided in the shell housing, the crosstalk shield having mating sections and mounting sections, the mating sections having a width which is less than a width of the mounting sections;

contacts positioned in the contact receiving opening of the housing, the contacts terminating high speed conductors of the high speed cable;

a nonconductive component provided only on the inside wall in the mating portion of the shell housing and secured to the inside wall, the nonconductive component having a generally uniform thickness of between approximately 0.1 mm to approximately 0.5 mm, recesses spaced periodically about an inner circumferences of the nonconductive component, the recesses positioned to be aligned with side edges of the mating sections of the crosstalk shield, the recesses being of reduced cross section as compared to a remainder of the nonconductive component, the reduced cross section providing clearance for the side edges of the mating sections of the crosstalk shield;

wherein the nonconductive component electrically and physically isolates the contacts from the shell housing.

2. The assembly as recited in claim 1, wherein the nonconductive component is a layer of Kapton tape fixed to the inside wall.

3. The assembly as recited in claim 1, wherein the nonconductive component is a nonconductive surface treatment applied to the inside wall of the mating portion.

4. The assembly as recited in claim 1, wherein the nonconductive component is a molded component maintained inside the mating portion of the shell housing.

5. The assembly as recited in claim 1, wherein the nonconductive component has a thickness of between approximately 0.15 mm to approximately 0.25 mm.

6. The assembly as recited in claim 1, wherein the crosstalk shield has a first shield member and a second shield member which define contact receiving cavities.

7. The assembly as recited in claim 6, wherein the first shield member and the second shield member have mounting sections and mating sections, the mating sections are positioned in the mating portion of the shell housing.

8. The assembly as recited in claim 7, wherein the mating sections of the first shield member and the second shield member have side edges, a width of the mating sections is less than a diameter of the contact receiving opening of the mating portion of the connector shell housing, wherein the side edges of the mating sections of the first shield member and the second shield member are spaced from the inside wall of the mating portion.

9. The assembly as recited in claim 8, wherein the side edges of the mating sections of the first shield member and the second shield member are spaced from the inside wall of the mating portion by a distance of between approximately 0.1 mm to approximately 0.5 mm.

10. The assembly as recited in claim 1, wherein the contacts are positioned in contact spacers.

11. The assembly as recited in claim 10, wherein the contact spacers are positioned in the contact receiving cavities defined by the first shield member and the second shield member of the crosstalk shield.

12. The assembly as recited in claim 11, wherein each contact spacer houses two contacts.

13. The assembly as recited in claim 12, wherein two contacts in each contact spacer are differential pairs of contacts.

14. The assembly as recited in claim 13, wherein the contact spacers have a triangular configuration with a first closed side, a second closed side and a third open side, the first closed side and the second closed side are positioned proximate the first shield member and the second shield member, the open third side is positioned proximate the inside wall of the mating portion.

15. An assembly for terminating a high speed cable, the assembly comprising:

a shell housing having a mating end and a conductor receiving end, a mating portion extending from the mating end, the mating portion having a contact receiving opening with an inside wall extending circumferentially around the opening, the mating portion having a smaller outside diameter than an outside diameter of the remainder of the shell housing;

a crosstalk shield provided in the shell housing, the crosstalk shield having a first shield member and a second shield member which define contact receiving cavities, the first shield member and the second shield member having mounting sections and mating sections, the mating sections positioned in the mating portion of the shell housing, the mating sections of the first shield member and the second shield member having widths which are less than a width of the mounting sections;

contacts positioned in contact spacers in contact receiving cavities in the contact receiving opening of the housing, the contact terminating high speed conductors of the high speed cable, the contact receiving cavities defined by the first shield member and the second shield member of the crosstalk shield;

a nonconductive component provided only on the inside wall in the mating portion of the shell housing and secured to the inside wall, the nonconductive component having a generally uniform thickness of between approximately 0.1 mm to approximately 0.5 mm;

wherein the nonconductive component electrically and physically isolates the contacts from the shell housing.

16. The assembly as recited in claim 15, wherein the mating sections of the first shield member and the second shield member have side edges, a width of the mating sections is less than a diameter of the contact receiving opening of the mating portion of the connector shell housing, wherein the side edges of the mating sections of the first shield member and the second shield member are spaced from the inside wall of the mating portion.

* * * * *